No. 764,327. Patented July 5, 1904.

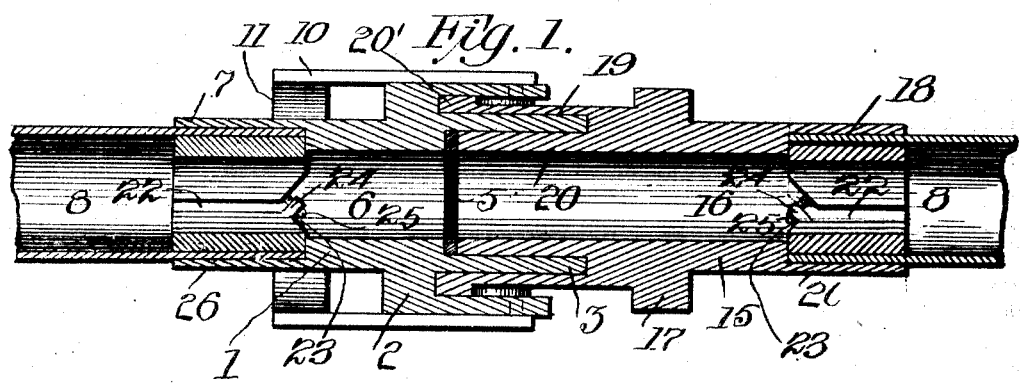
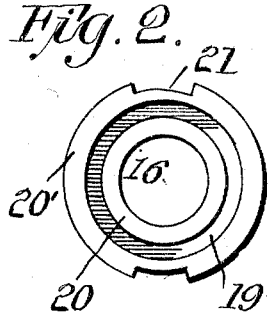
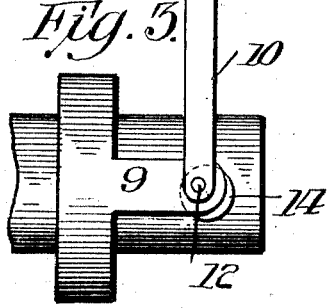
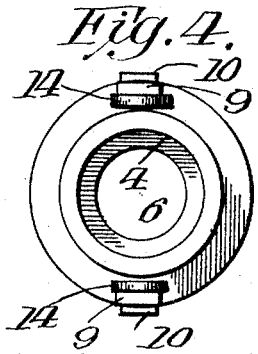
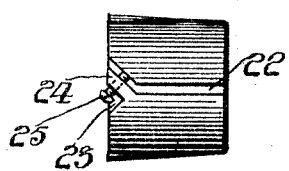
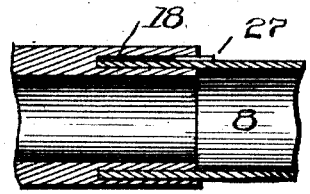

UNITED STATES PATENT OFFICE.

CHARLES H. ZESSIN, OF HOMESTEAD, PENNSYLVANIA.

HOSE-COUPLING.

SPECIFICATION forming part of Letters Patent No. 764,327, dated July 5, 1904.

Application filed June 24, 1903. Serial No. 162,832. (No model.)

*To all whom it may concern:*

Be it known that I, CHARLES H. ZESSIN, a citizen of the United States of America, residing at Homestead, in the county of Allegheny and State of Pennsylvania, have invented certain new and useful Improvements in Hose-Couplings, of which the following is a specification, reference being had therein to the accompanying drawings.

This invention relates to certain new and useful improvements in hose-couplers, and has for its object the provision of novel means whereby two sections of hose may be easily, quickly, and effectually coupled together.

Another object of my invention is the provision of novel means whereby when the two sections have been placed together they may be securely locked, suitable construction being provided whereby the lock is protected from all rough usages.

A further object of my invention is the provision of novel means whereby the hose may be securely fastened within the coupler-sections; and a still further object is to provide a hose-coupler which will be extremely simple in construction, strong and durable, comparatively inexpensive to manufacture, and highly efficient when used.

In describing the invention in detail reference is had to the accompanying drawings, forming a part of this specification, and wherein like numerals of reference indicate like parts throughout the several views, in which—

Figure 1 is a longitudinal sectional view of my improved hose-coupler. Fig. 2 is an end view of the female member. Fig. 3 is a side elevation of the male member. Fig. 4 is an end view of said member. Fig. 5 is a side elevation of the means employed to secure the hose within the coupler-section, and Fig. 6 is a modified form of securing means.

To put my invention into practice, I provide two members, the male member 1 of which carries the enlarged collar 2, having a projecting tubular portion 3, formed integral therewith. The end of the said tubular extension is recessed, as indicated at 4, and in which is seated the rubber gasket 5. This member 1 has an aperture 6 formed its entire length, and the other end of the member 1 has an annular recess 7, in which is secured the hose 8. The enlarged collar 2 of the member 1 carries the extending lugs 9, to which are secured the arms 10 of the yoke 11, and the arms 10 are pivoted to the lugs 9 by a pin 12, and upon the other end of the pin and upon the inner faces of the lugs 9 is mounted the cams 14, as illustrated in Figs. 3 and 4 of the drawings.

The female member 15 comprises a tubular portion having a central aperture 16 formed longitudinally therein, said member also carrying an enlarged collar 17, and the one end of the female member 15 is recessed, as indicated at 18, forming an annular groove similar to the groove 7 of the male member 1. The other end of the female member carries an annular recess 19, which forms an annular projection 20, which is adapted to be seated in the annular recess 4 of the male member, and upon the outer wall of the annular recess 19 I provide the collar 25, which has notches 21 formed therein diametrically opposite each other, the object of which will be hereinafter described.

In securing the hose within the coupler-sections I employ an annular ring or band, as illustrated in Fig. 5 of the drawings, this ring or band being split, as indicated at 22, the one edge of said band being cut away, as indicated at 23, forming a lug 24, through which is passed a screw 25, and when the hose has been placed within the annular recesses or grooves 7 and 18 the band is placed in said recesses and the screw 25 adjusted to expand the ring or band, whereby the hose will be forced outwardly against the outer shell 26 of the sections, whereby the same will be rigidly and securely held.

When it is desired to connect two sections of hose together, the female member 15 is forced inwardly until the portion 20 has been seated within the recess 4, the member 15 having first been rotated until the notches 21 are in alinement with the cams 14, when the same is further forced into position, rotated until the cams 14 have become engaged behind the annular collar 20', when the yoke 11 is forced downwardly toward the hose, the cam 14 forcing the collar 20' against the annular collar 2, whereby the two sections will be firmly secured together and locked in this position until it is desired to release the same.

It will be noted in using my improved hose-securing means that when the hose has a tendency to withdraw from the coupler-sections the same will be more securely held on account of the tapered exterior sides of the annular bands, and it will be seen that the hose may be removed at any desired time when a new hose is to be placed therein. In Fig. 6 of the drawings I have illustrated a modified form of securing the hose within the coupler-sections, wherein a wedge 27 is employed similar to the annular band or ring.

While I have herein shown and described a practical embodiment of my invention, it will be obvious that various changes may be made in the details of construction without departing from the general spirit of my invention.

Having fully described my invention, what I claim as new, and desire to secure by Letters Patent, is—

1. A hose-coupling comprising a male and female member with an aperture formed in each of said members longitudinally thereof, said male member having an annular recess formed in one end thereof, a tubular extension carried by the same end of the member, an annular collar formed integral with said member and having extending lugs, said female member comprising a tubular portion having an annular recess formed in its one end, an enlarged collar having notches formed upon said member, a yoke pivoted to the lugs of the male member, cams carried by said yoke and adapted to engage the enlarged collar having notches formed therein.

2. A hose-coupling comprising a male and female member with an aperture formed in each of said members longitudinally thereof, said male member having an annular recess formed in one end thereof, a tubular extension carried by the same end of the member, an annular collar formed integral with said member and having extending lugs, said female member comprising a tubular portion having an annular recess formed in its one end, an enlarged collar having notches formed upon said member, a yoke pivoted to the lugs of the male member, cams carried by said yoke and adapted to engage the enlarged collar having notches formed therein.

In testimony whereof I affix my signature in the presence of two witnesses.

CHARLES H. ZESSIN.

Witnesses:
   E. E. POTTER,
   K. H. BUTLER.